United States Patent
Engi et al.

(10) Patent No.: US 11,824,741 B1
(45) Date of Patent: Nov. 21, 2023

(54) COMPLEXITY RANKING IN NETWORK DEVICE POLICIES

(71) Applicant: Cisco Technology, Inc., San Jose, CA (US)

(72) Inventors: Derek William Engi, Pleasant Ridge, MI (US); Gonzalo Salgueiro, Raleigh, NC (US); Ravi Prakash Garg, Chicago, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/894,652

(22) Filed: Aug. 24, 2022

Related U.S. Application Data

(60) Provisional application No. 63/325,689, filed on Mar. 31, 2022.

(51) Int. Cl.
| | |
|---|---|
| *H04L 12/26* | (2006.01) |
| *H04L 43/06* | (2022.01) |
| *H04L 43/04* | (2022.01) |
| *H04L 43/02* | (2022.01) |

(52) U.S. Cl.
CPC ............. *H04L 43/06* (2013.01); *H04L 43/02* (2013.01); *H04L 43/04* (2013.01)

(58) Field of Classification Search
CPC ......... H04L 43/00; H04L 43/02; H04L 43/04; H04L 43/045; H04L 43/06; H04L 43/08
See application file for complete search history.

(56) References Cited

U.S. PATENT DOCUMENTS

| | | |
|---|---|---|
| 2007/0180490 A1 | 8/2007 | Renzi et al. |
| 2013/0055342 A1 | 2/2013 | Choi et al. |
| 2014/0366082 A1 | 12/2014 | Agrawal et al. |
| 2014/0379895 A1 | 12/2014 | Jain |
| 2017/0104790 A1 | 4/2017 | Meyers et al. |
| 2021/0377114 A1 | 12/2021 | Nelson et al. |

OTHER PUBLICATIONS

L. Lymberopoulos, "An Adaptive Policy Based Framework for Network Management", Department of Computing, Imperial College London, University of London, Oct. 2004, 134 pages.

*Primary Examiner* — Boris D Grijalva Lobos
(74) *Attorney, Agent, or Firm* — BEHMKE INNOVATION GROUP LLC; James M. Behmke; James J. Wong

(57) ABSTRACT

In one embodiment, an illustrative method herein comprises: determining, by a process, for each group of policies configured across a plurality of network devices in a computer network, an information set having a list of all policy components used for each group and which policies within each group have which particular policy components of the list of all policy components used for that group; performing, by the process, a comparative analysis of similarity and component variance on policies within each group based on the information set; deriving, by the process, an overall complexity indicator for each group based on the comparative analysis; and providing, from the process to an assessment interface, a ranking of each group as compared to other groups of policies within the computer network based on their respective overall complexity indicator.

19 Claims, 11 Drawing Sheets

| | policy-map QoS-out | description QOS for WAN interface | class voice-traffic-out | priority percent 40 | class video-traffic-out | bandwidth remaining percent 30 | class critical-traffic-out | class business-traffic-out | bandwidth remaining percent 20 | class scavenger-out | ... | class type queuing GROUP2 |
|---|---|---|---|---|---|---|---|---|---|---|---|---|
| 17d1896df6d0e712de618e6591030 0a8 | 1.0 | 1.0 | 1.0 | 1.0 | 1.0 | 1.0 | 1.0 | 1.0 | 1.0 | 1.0 | ... | 0.0 |
| 5af71f26b68df3a6b905aedb96e6df67 | 1.0 | 0.0 | 1.0 | 0.0 | 1.0 | 0.0 | 1.0 | 1.0 | 1.0 | 1.0 | ... | 0.0 |
| a9cfa7ac78a1aa1e3b56405d6bc8920e | 1.0 | 1.0 | 1.0 | 0.0 | 1.0 | 1.0 | 1.0 | 1.0 | 0.0 | 1.0 | ... | 0.0 |
| 1ecf50 68dd71eccd62e53d44c1e00eca | 1.0 | 0.0 | 1.0 | 0.0 | 1.0 | 0.0 | 1.0 | 1.0 | 0.0 | 1.0 | ... | 0.0 |
| 4417314f0e2aeef2233f20f7174e7b7c | 1.0 | 0.0 | 0.0 | 0.0 | 0.0 | 0.0 | 0.0 | 0.0 | 0.0 | 0.0 | ... | 0.0 |

FIG. 4

| Policy Group 805 | clusters 810 | sqdist 815 | n_components 820 | variations 825 | var_dev_ratio 830 | complexity_score 835 | adj_score 840 | complexity 845 |
|---|---|---|---|---|---|---|---|---|
| A | 6 | 3527.626825 | 151 | 189 | 0.000000 | 4.582110 | 1.000000 | critical |
| B | 3 | 4088.195397 | 150 | 189 | -0.005277 | 4.211960 | 0.838428 | critical |
| C | 7 | 457.488972 | 73 | 107 | -0.009302 | 3.040568 | 0.327112 | high |
| D | 5 | 313.929211 | 89 | 114 | 0.000000 | 2.817082 | 0.229559 | high |
| E | 4 | 778.094766 | 72 | 107 | -0.009302 | 2.612324 | 0.140182 | high |
| F | 6 | 251.733954 | 32 | 43 | -0.045462 | 2.205688 | -0.037316 | medium |
| G | 5 | 647.195454 | 25 | 33 | 0.000000 | 2.041083 | -0.109167 | medium |
| H | 5 | 587.789259 | 21 | 27 | 0.000000 | 1.967970 | -0.141081 | medium |
| I | 6 | 91.679500 | 14 | 20 | 0.000000 | 1.929384 | -0.157924 | medium |
| J | 6 | 87.802667 | 10 | 15 | 0.000000 | 1.875174 | -0.181587 | medium |

FIG. 8

In [40]: df[df["complexity"]=="critical"].sort_values("complexity_score",ascending=False)

Out[40]:

| sqdist | n_components | variations | var_dev_ratio | complexity_score | complexity | adj_score | policy_name | product_family | policy_type | policy_type | devices |
|---|---|---|---|---|---|---|---|---|---|---|---|
| 1297.738571 | 3 | 14 | -3.247047 | 3.588779 | critical | 1.000000 | QOS-REMARK | Cisco 2900 Series Integrated Services Routers | policy-map | MARKING | 360 |
| ... | | | | | | | | | | | |
| 54.125000 | 6 | 8 | 0.000000 | 3.580169 | critical | 0.997600 | BLOCK-OUTBOUND | Cisco 4000 Series Integrated Services Routers | acl | EXTENDED | 8 |
| 101.898750 | 4 | 8 | -1.139434 | 3.049284 | critical | 0.849639 | 99 | Cisco Catalyst 4500 Series Switches | acl | STANDARD | 25 |

COMPLEXITY RANKING IN NETWORK DEVICE POLICIES

RELATED APPLICATION

This application claims priority to U.S. Prov. Appl. Ser. No. 63/325,689, filed on Mar. 31, 2022, entitled COMPLEXITY RANKING IN NETWORK DEVICE POLICIES, by Engi, et al., the contents of which are incorporated herein by reference.

TECHNICAL FIELD

The present disclosure relates generally to computer systems, and, more particularly, to complexity ranking in network device policies.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect. In particular, one cause of difficulty within a computer network is when policies vary and deviate from standard configurations in network device configurations.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example table of the conversion of text-based policy into a one hot encoding of policy components per variation hash;

FIG. 8 illustrates an example table of the combination of attributes that define an overall indicator of complexity based on the components, clusters, variations, and devices with a particular policy;

FIG. 10 illustrates an example dashboard showing filtering of critical policies.

DESCRIPTION OF EXAMPLE EMBODIMENTS

Overview

Figure 1:
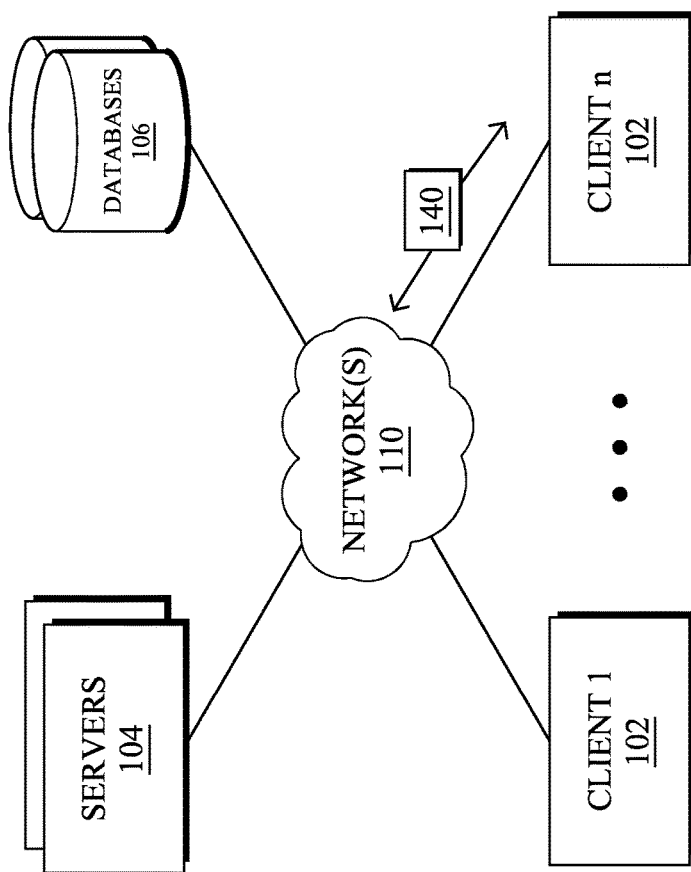
FIG. 1 illustrates an example computer network.

According to one or more embodiments of the disclosure, complexity ranking in network device policies is described herein. The techniques provide a mechanism for using machine learning capabilities to identify and rank the complexity level of configured policies based upon the overall deployment and similarity of variations. That is, the techniques herein build upon variation analytics in Policy Variation Analysis tools to identify network device policies that exhibit a high degree of complexity due to lack of standardization and uniformity of deployment. Policies can then be targeted for remediation and strategic development as a result of their contribution to overall network complexity and supportability.

In particular, in one embodiment, an illustrative method herein may comprise: determining, by a process, for each group of policies configured across a plurality of network devices in a computer network, an information set having a list of all policy components used for each group and which policies within each group have which particular policy components of the list of all policy components used for that group; performing, by the process, a comparative analysis of similarity and component variance on policies within each group based on the information set; deriving, by the process, an overall complexity indicator for each group based on the comparative analysis; and providing, from the process to an assessment interface, a ranking of each group as compared to other groups of policies within the computer network based on their respective overall complexity indicator.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
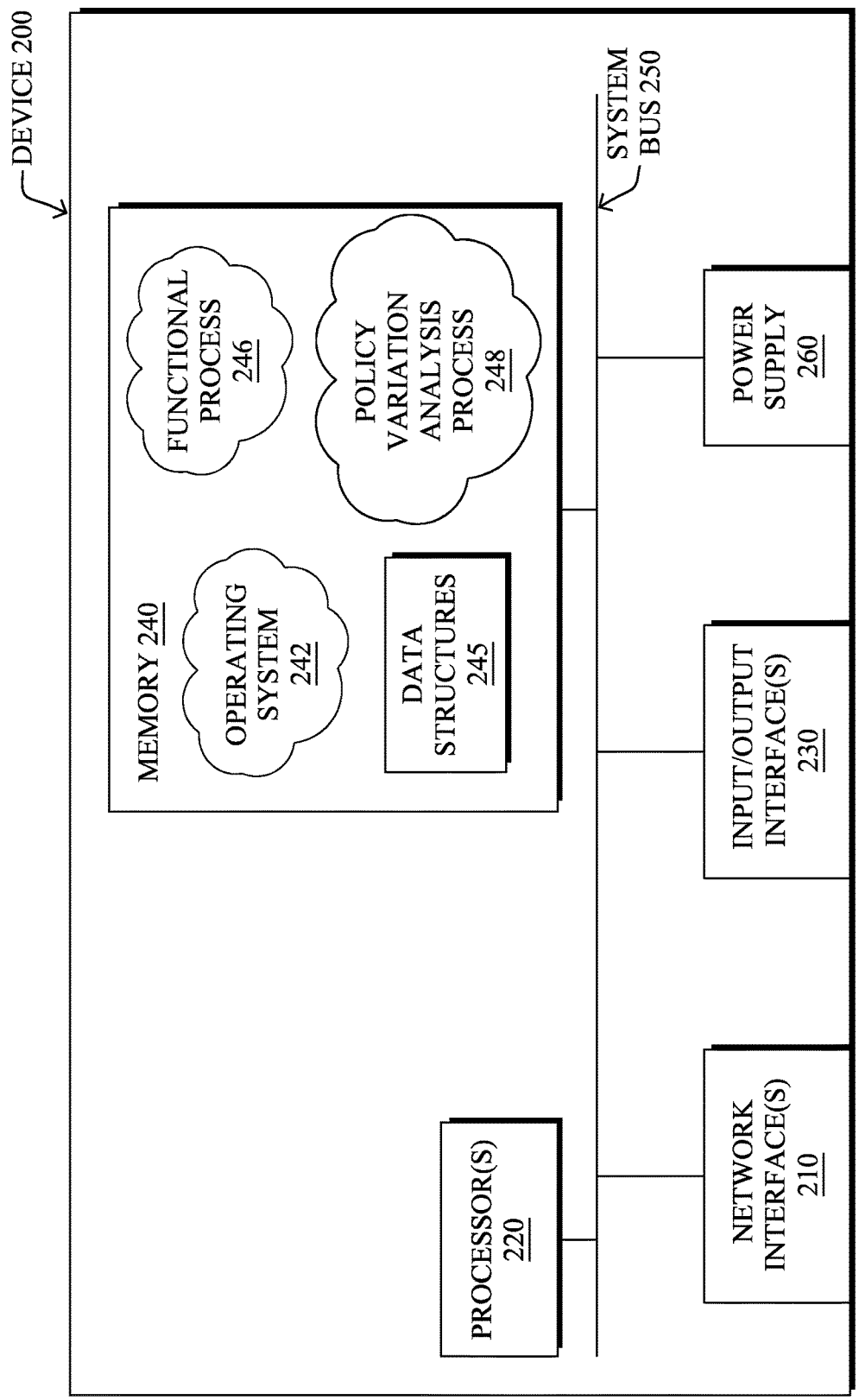
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "policy variation analysis" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Complexity Ranking in Network Device Policies

Policy Variation Analysis (PVA) is a feature that identifies policy variations and deviations from standard configurations in network device configurations. A challenge that exists when delivering remediation information to a customer, however, includes prioritizing the policies that need attention in their environment.

The techniques herein, therefore, provide a mechanism for using machine learning capabilities to identify and rank the complexity level of configured policies based upon the overall deployment and similarity of variations. That is, the techniques herein build upon variation analytics in Policy Variation Analysis tools to identify network device policies that exhibit a high degree of complexity due to lack of standardization and uniformity of deployment. As described in greater detail below, policies can then be targeted for remediation and strategic development as a result of their contribution to overall network complexity and supportability.

Notably, the techniques herein may thus employ any number of machine learning techniques, such as to classify the collected data and to cluster the data as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

Operationally, the techniques herein use comparative analysis of the similarity and component variance that exists in network device policies to identify and prioritize policies that are at risk of negatively affecting the supportability of a network environment. Since network policy provides the framework and boundaries of how devices communicate and operate, deviation from standards and uniform deployments of policies contributes to decreased supportability and expected results.

The techniques herein create a framework for identifying policy variations and determining the depth and breadth of the impact policy variations have in the environment.

Figure 3:
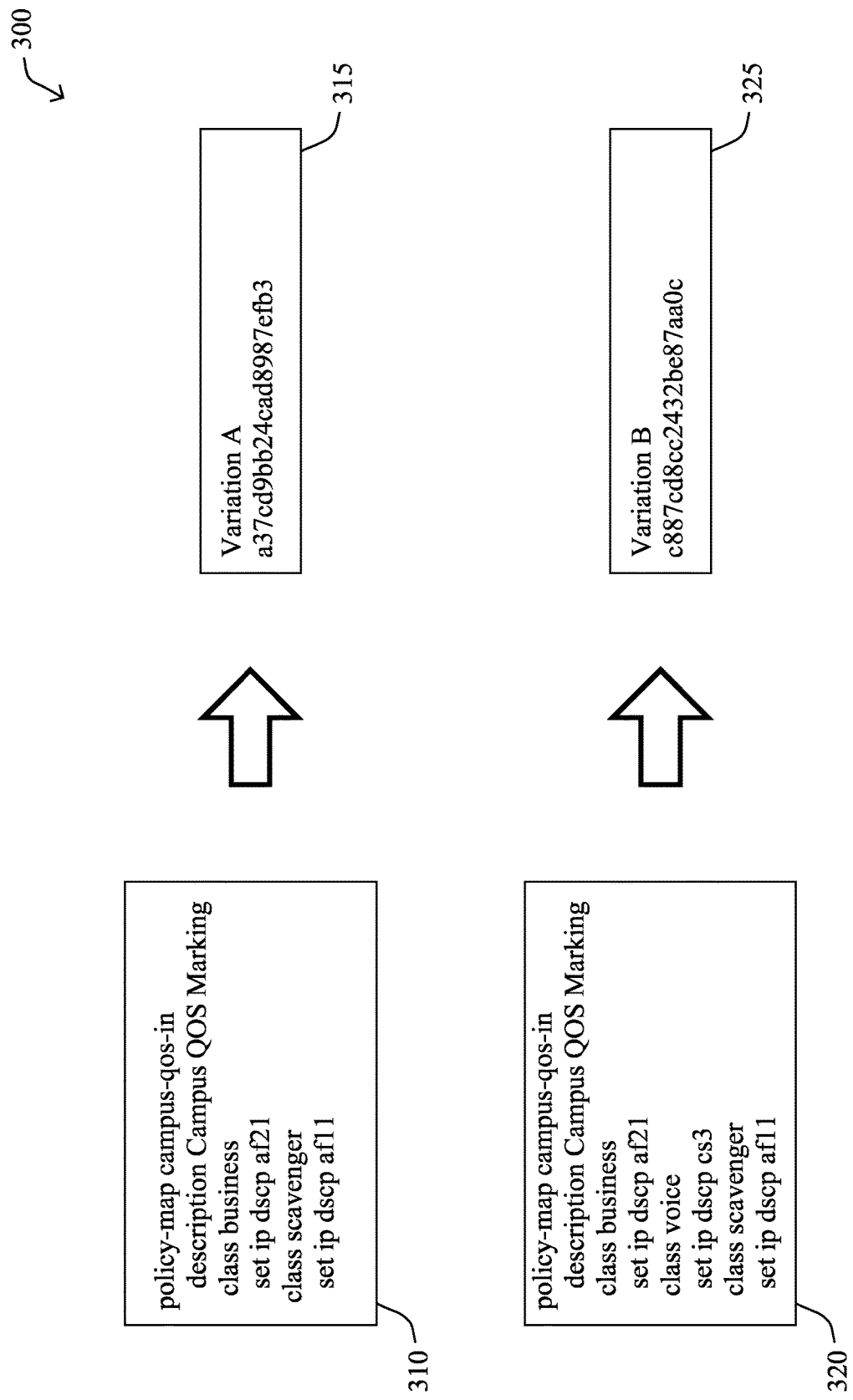
FIG. 3 illustrates an example of the translation of a text-based policy to unique identifier hashes.

Text policies are collected from network devices and converted to a hash that defines a unique identifier for each implementation of the policy based on the policy name that was extracted. FIG. 3 depicts an example 300 of the translation of a text-based policy (policies 310 and 320) to unique identifier hashes (e.g., hash 315 for "Variation A" and hash 325 "Variation B") for an example policy-map "campus-qos-in" (having a description of "Campus QOS Marking"). (As can be seen, the actual policies have at least one difference (e.g., "class voice—set ip dscp cs3") between the two.)

A "one hot encoding", as will be understood by those skilled in the art (e.g., a process by which categorical variables are converted into a form that could be provided to ML algorithms for better prediction), may then be created of all the potential policy components that were discovered for a given policy name. Each policy variation (represented by the hash of the policy text) is then assigned True/False values based on the presence or non-presence of the policy component in the text of the policy. FIG. 4 illustrates an example table 400 of the conversion of text-based policy into a one hot encoding of policy components per variation hash. In particular, hashes 410 of the plurality of policies in question form the row headings, while each possible policy component 415 create the numerous columns. Entries 420 may then simply indicate a binary value (e.g., 1 or 0) indicating whether the corresponding policy (hash 410) has a particular component 415.

Principal Component Analysis (PCA) may then be used to identify the number of components required to explain the majority of variance within the set of policies. For instance, if the total variance can be explained with few components, this indicates that the policy variations are fairly similar to each other and there is not much deviation from an overall theme characterized by the policy. Inversely, if the majority of the total available components are required to achieve a high level of variance description, the implication exists that the policy variations are thematically different from each other and do not share common attributes. The techniques herein, therefore, uniquely provide an assessment of variance at the policy component level for determining similarity as it relates to complexity. PCA is often used as dimension reduction technique, and the techniques herein use this function as a metric to identify underlying themes in policy.

Figure 5:
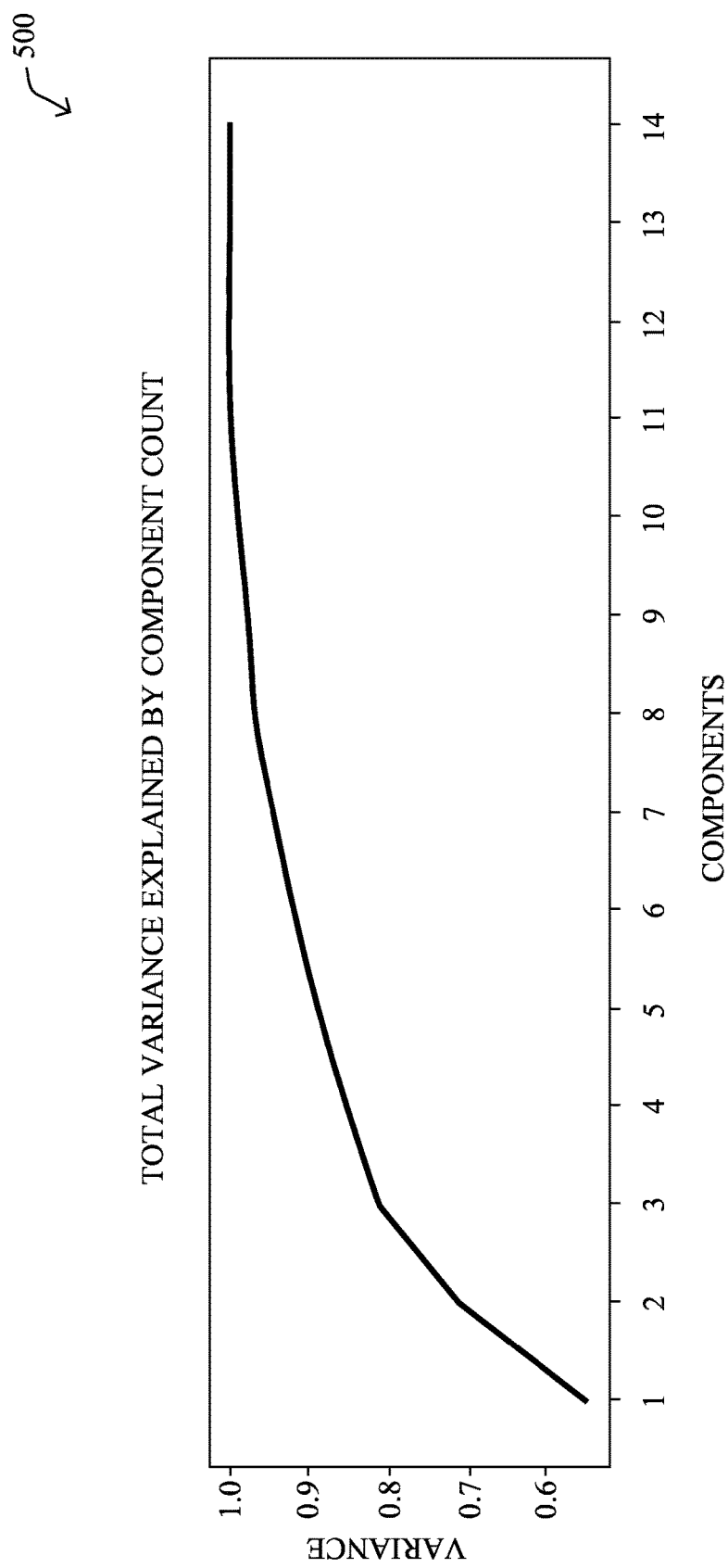
FIG. 5 illustrates an example plotting of total variance explained by the number of components identified in the policy.

FIG. 5 depicts an example plotting 500 of total variance explained by the number of components identified in the policy. The number of components defines a threshold of "thematic acceptability" and gives insight into how similar policy item are to each other.

An additional attribute that may be used by the techniques herein involves the clustering of policy variations based upon the text components that comprise the policy.

That is, the techniques herein identify if there are additional relationships that exist among a set of policies, and to determine the similarity distance that occurs between each cluster.

Figure 6:
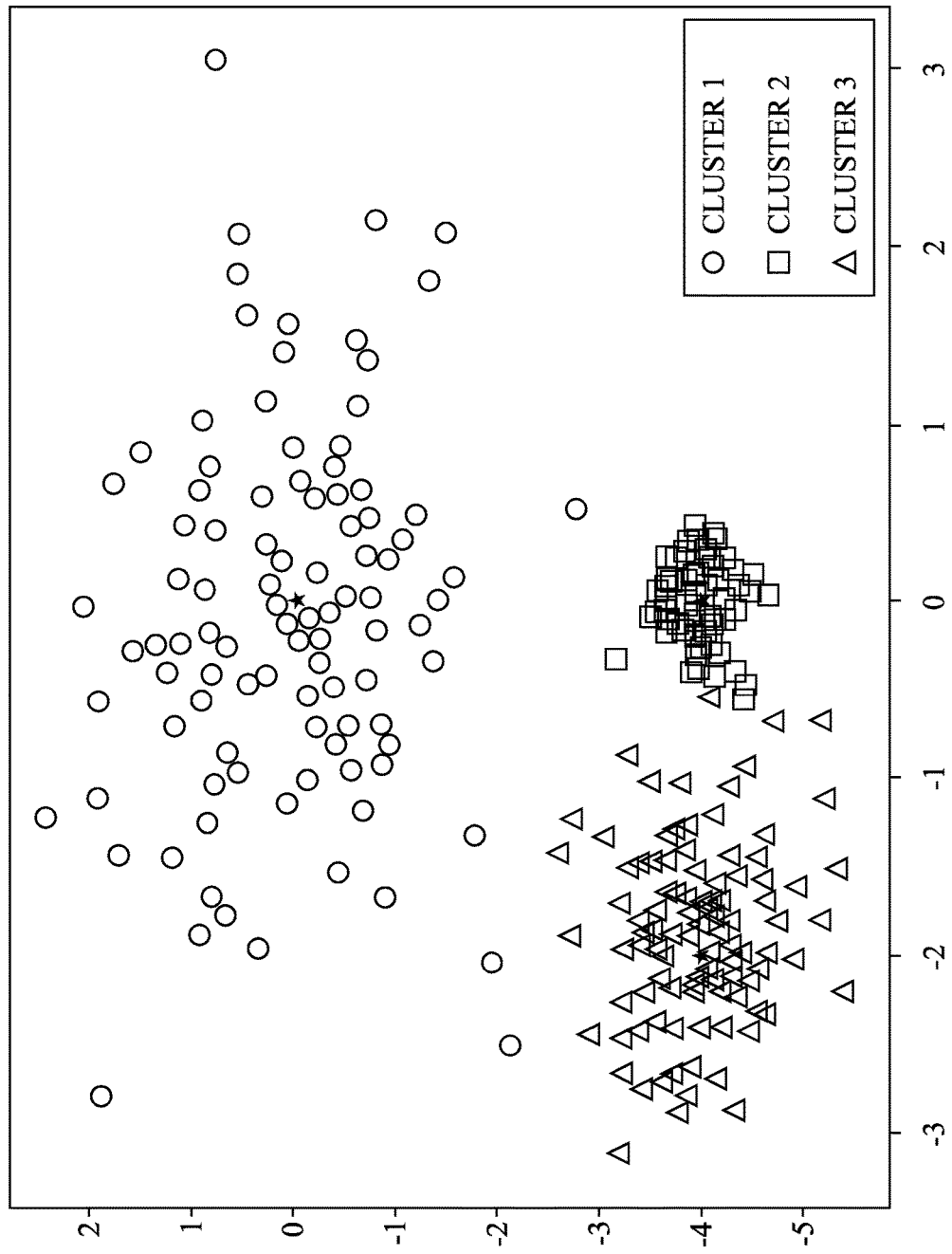
FIG. 6 illustrates an example of policy similarity clustering and theme identification.

FIG. 6 illustrates an example plotting 600 of the one hot encoded data frame of policy components (that is, policy similarity clustering and theme identification). Using silhouette scores to determine the optimal number of clusters that define the policy set, subgroups of the policies become visible as a result of shared components being common across each policy variation. As shown, three clusters (e.g., "Cluster 1" as circles, "Cluster 2" as squares, and "Cluster 3" as triangles) can be determined in this example, accordingly.

Figure 7:
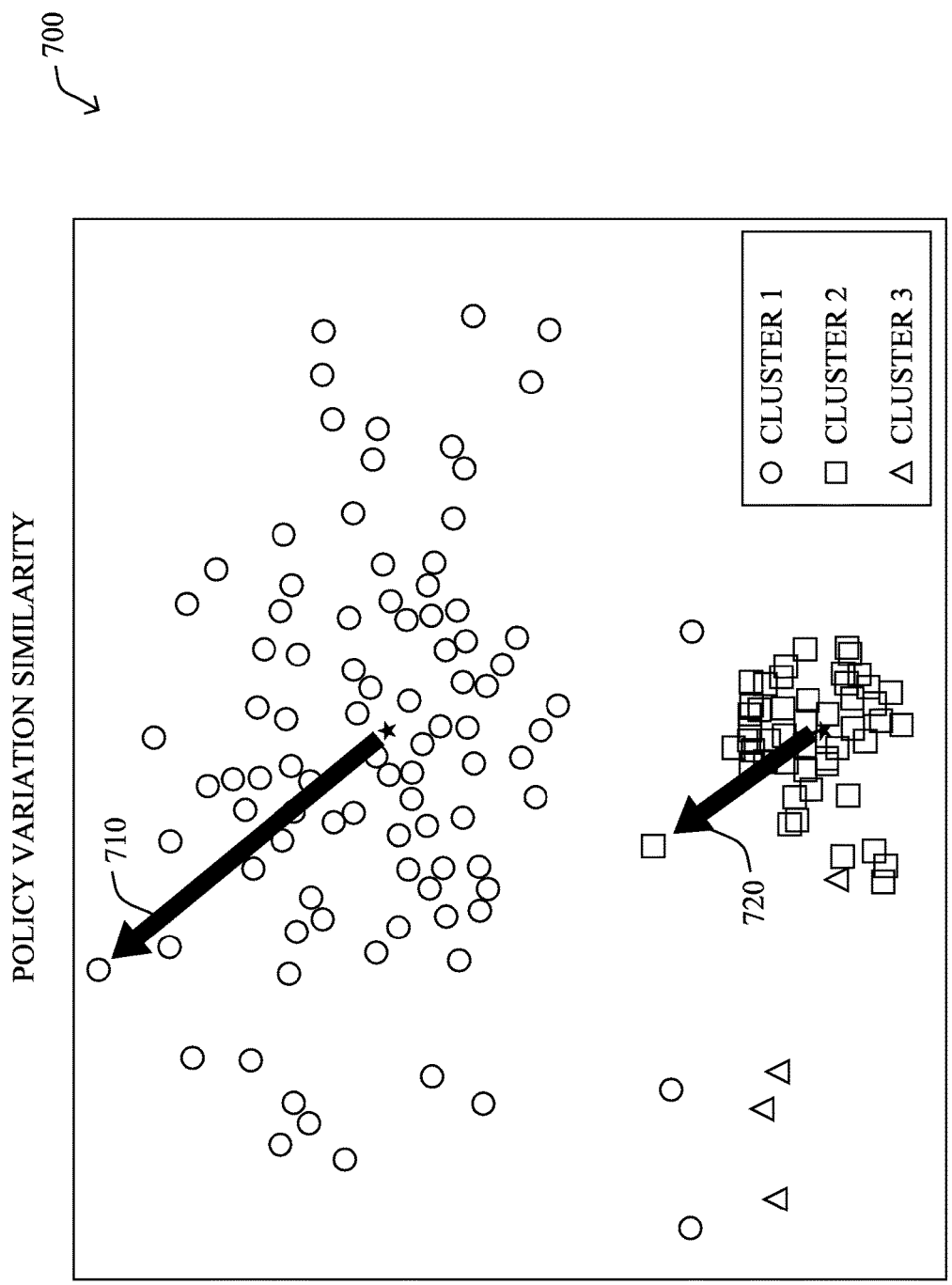
FIG. 7 illustrates an example plot of a cluster distance and width calculation.

The techniques herein then use the mean distance of each policy to determine the overall "spread" of variation for each cluster. FIG. 7 depicts an example plot 700 of the calculation of overall distance of each cluster (that is, a cluster distance and width calculation). As seen in the chart, the circle cluster of policies (top cluster 1) expresses enough similarity to each other to be categorized in the same general cluster but exhibits looser relationship to the individual policy components that comprise the policy. The square cluster (bottom right cluster 2) represents a group of policy variations that exhibit a higher degree of similarity based on the components that they share. The circle cluster 1 will have a larger distance 710 to define the components used, while the square cluster 2 can be represented with a smaller, denser cluster with less distance 720 between the cluster center and each point, meaning the variations do not deviate from each other as much as the circle cluster 1.

A complexity score may then be derived by the sum of multiple components identified by the component and cluster analysis performed in the previous steps. FIG. 8 illustrates an example table 800 of the combination of attributes that define an overall indicator of complexity based on the components, clusters, variations, and devices with a particular policy. For example, certain attributes for each row (corresponding to a particular policy group 805, e.g., "A" through "J") may comprise such things as the number of clusters 810 within the group, a squared distance 815 ("sqdist") of the group (from similarity distance above), a number of components 820 within the group, a number of variations 825 within the group, a variation deviation ratio 830 of the group (e.g., a coefficient of variation equation), a complexity score 835 for the group (calculated from any suitable formulation of the previous attributes), an adjusted (adj) score 840 for the group (e.g., placing the highest complexity score 835 at "1.0" and then scaling/adjusting the remaining groups, accordingly), and so on. A complexity classifier 845 may also be assigned to the numeric value based on the distribution of the complexity score relative to all other policies (e.g., "critical", "high", "medium", "low", or any other desired levels/terms/etc., such as red/yellow/green, priorities 1-10, and so on), such as for ease of consumption on a user interface.

Figure 9:
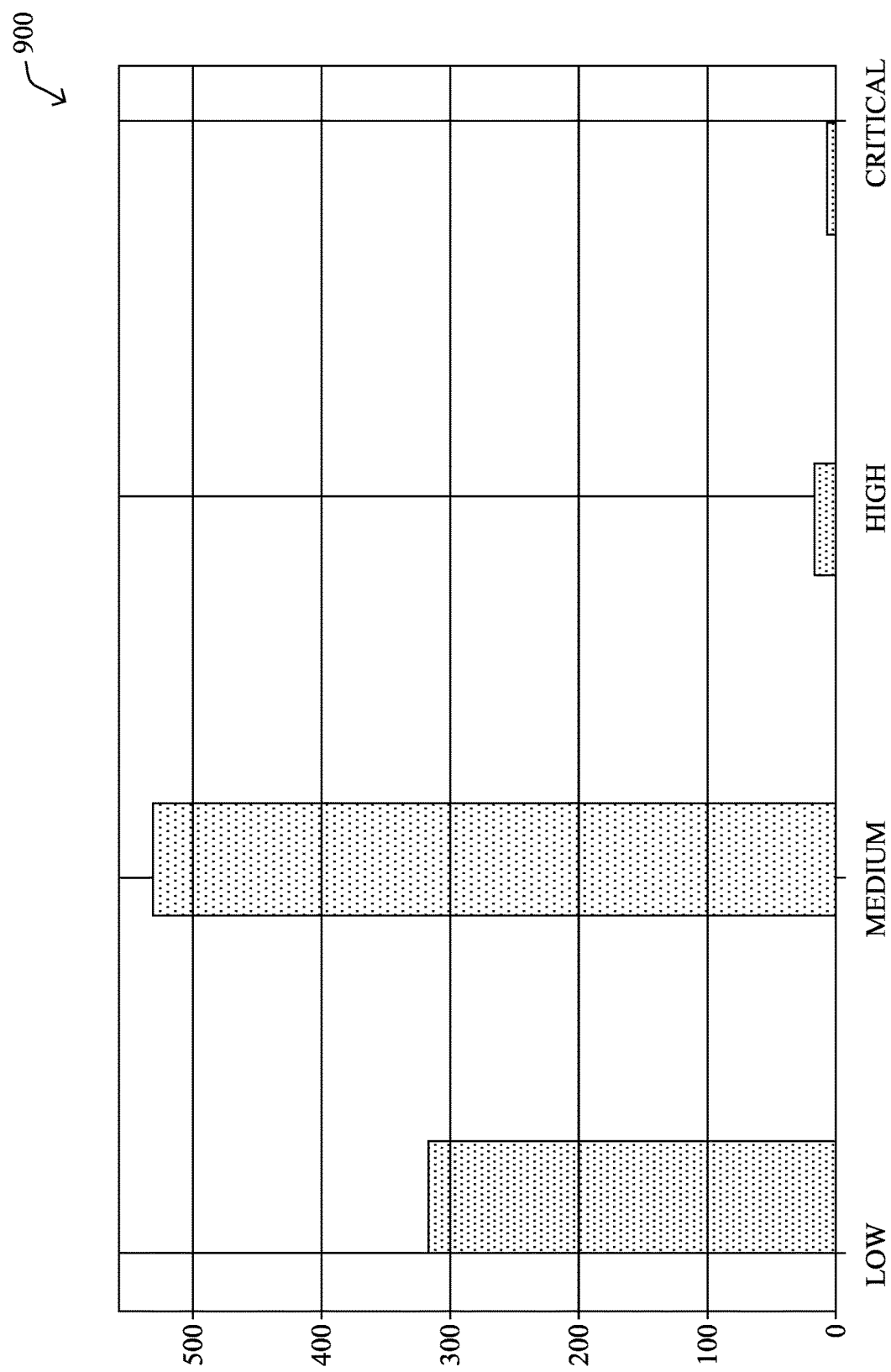
FIG. 9 illustrates an example chart of the distribution of policies by the complexity level in a network environment.

FIG. 9 depicts an example chart 900 of the distribution of policies by the complexity level in a network environment. As illustrated by FIG. 10 (dashboard 1000), additional policy metadata 1010 including policy name and product family or other grouping mechanisms (e.g., policy type, policy class, number of devices within the group, etc.) may be recombined with the complexity data and can be filtered for identification of remediation candidates. This serves as a prioritization mechanism when evaluating which policies may benefit from optimization due to potential negative impacts to overall network support.

The techniques described herein, therefore, provide for complexity ranking in network device policies. In particular, the use of variance and similarity distance by the techniques herein provides an effective mechanism for classifying policy complexity and the identification of potential deviations from policy standards, specifically by using attributes not normally associated with network device policy management, further using these attributes to define an analytics-based metric that describes overall complexity. Highlights of the techniques herein, for instance, are as follows:

The use of cumulative component analysis for explained variance summarization and prioritization of network device policy recommendations.

The use of network policy components to explain the variance and similarity trends that exist for a group of network devices.

Using component variance and cluster distances to define a weighted complexity metric for network device policy deployments.

The creation of an analytics based complexity metric based on the similarity and deployment of network device policies.

The identification of network device policies that have a negative impact on the environment due to a high level of complexity and lack of standardization.

In addition, policy ranking and complexity labeling provides an opportunity to prioritize policies that are candidates for controller based policy management migrations. Using the analytics of the techniques herein can fast track the adoption of controller based management systems by providing a mechanism to identify candidate policies that fit the requirements for standardization and centralized management.

Notably, there are numerous known examples of policy management systems and policy frameworks, but these frameworks tend to focus on the enforcement of policy for service level agreements (SLAs) and compliance reasoning. None of these techniques, however, apply any sort of analytics to deployed policies in environments for the express purpose of identifying variation and complexity. The techniques herein, on the other hand, have insertion points into these frameworks to act as a prioritization mechanism for adaptive policy frameworks and policy management systems.

Illustratively, the techniques described herein may be performed by hardware, software, and/or firmware, such as in accordance with the illustrative policy variation analysis process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

Figure 11:
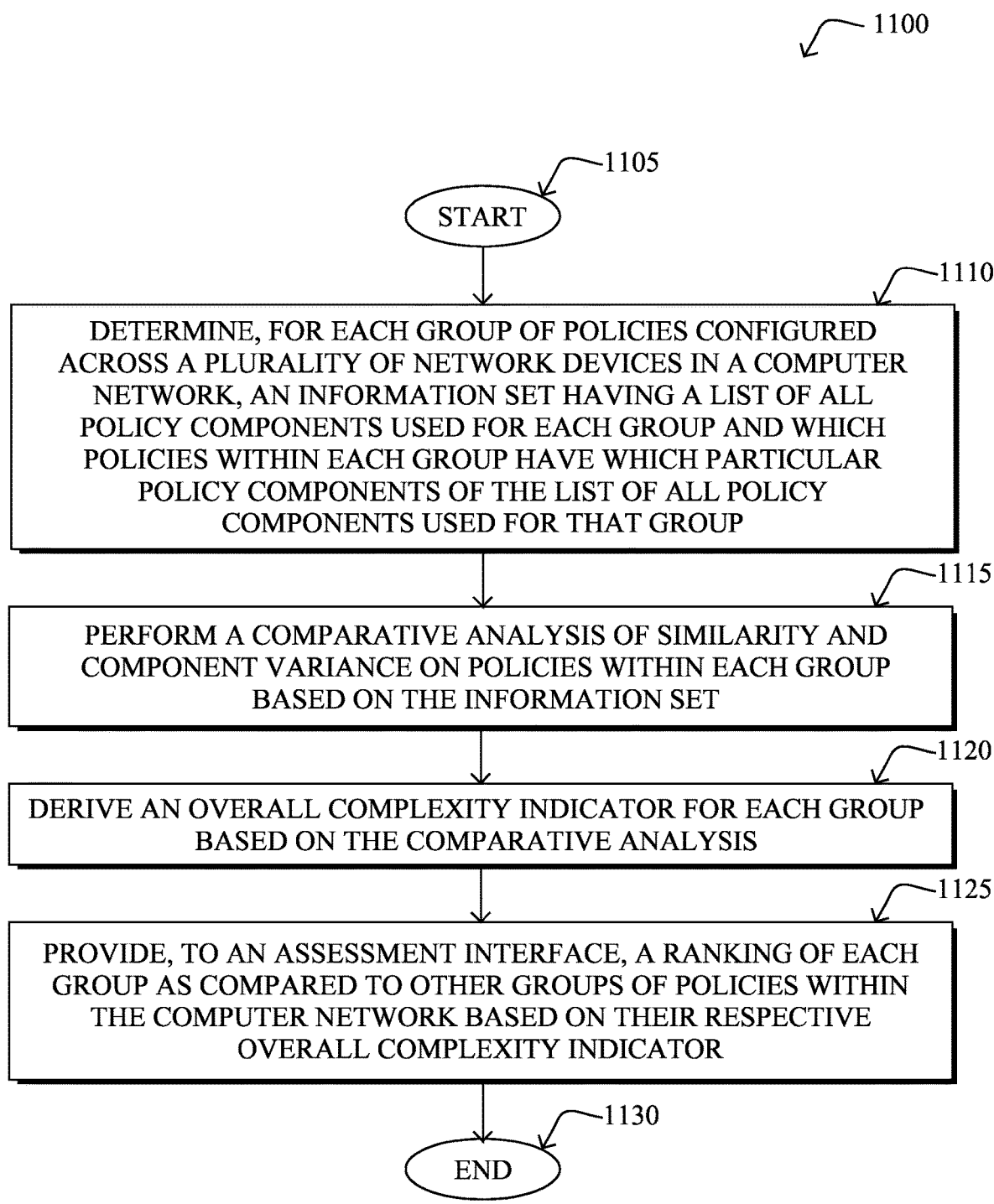
FIG. 11 illustrates an example procedure for complexity ranking in network device policies.

FIG. 11 illustrates an example simplified procedure 1100 for complexity ranking in network device policies in accordance with one or more embodiments described herein. For example, a non-generic, specifically configured device (e.g., device 200) may perform procedure 1100 by executing stored instructions (e.g., process 248). The procedure 1100 may start at step 1105, and continues to step 1110, where, as described in greater detail above, the techniques herein determine, for each group of policies configured across a plurality of network devices in a computer network, an information set having a list of all policy components used for each group and which policies within each group have which particular policy components of the list of all policy components used for that group. For example, as detailed above, after obtaining/collecting the policies from the devices, the techniques herein may create groups of policies based on the policies within that group having a shared (e.g., extracted) policy name, and may then perform a one hot encoding technique on the policies and the components for those groups, accordingly. Note, too, that in one embodiment, where policies are text based, the techniques herein may also convert each policy into a hash that provides a unique identification for each specific policy implementation within a particular group.

In step 1115, the techniques herein may then perform a comparative analysis of similarity and component variance on policies within each group based on the information set. For instance, as described in greater detail above, performing the comparative analysis may be based on assessing variance at a policy component level to determine similarity as it relates to complexity (e.g., using a principal component analysis to identify a number of components required to explain a majority of the variance within each group). Alternatively or in addition, performing the comparative analysis may be based on performing clustering of policies within each group based on the information set, and then determining a similarity distance between clusters of policies. As also noted above, the techniques herein may also determine a spread of variation of each of the clusters of policies, accordingly.

In step 1120, the techniques herein may then derive an overall complexity indicator (e.g., a computed score value) for each group based on the comparative analysis. As mentioned above, the techniques herein may also assign a classifier (e.g., critical, high, medium, or low) to the overall complexity indicator for each group based on a distribution of the overall complexity indicator for that group as compared to other groups.

In step 1125, the techniques herein may thus provide a ranking of each group as compared to other groups of policies within the computer network based on their respective overall complexity indicator. For example, the ranking may be provided to an assessment interface (e.g., a graphical user interface, a policy audit process, an autonomous policy remediation process, and so on), and the techniques herein may also associate additional metadata with each group for the assessment interface (e.g., product family, device type, device manufacturer, management entity, policy type, policy class, number of devices in group, etc.).

The simplified procedure 1100 may then end in step 1130, notably with the ability to continue updating complexity rankings in network device policies, accordingly. Other steps may also be included generally within procedure 1100. For example, such steps (or, more generally, such additions to steps already specifically illustrated above), may include other techniques and/or other specific embodiments as described herein, such as, for example, collecting the policies from each of the plurality of network devices in the computer network, converting the text-based policies into hashes, and so on.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

According to the embodiments herein, an illustrative method herein may comprise: determining, by a process, for each group of policies configured across a plurality of network devices in a computer network, an information set having a list of all policy components used for each group and which policies within each group have which particular policy components of the list of all policy components used for that group; performing, by the process, a comparative analysis of similarity and component variance on policies within each group based on the information set; deriving, by the process, an overall complexity indicator for each group based on the comparative analysis; and providing, from the process to an assessment interface, a ranking of each group as compared to other groups of policies within the computer network based on their respective overall complexity indicator.

In one embodiment, performing the comparative analysis comprises: assessing variance at a policy component level to determine similarity as it relates to complexity. In one embodiment, the method further comprises: using a principal component analysis to identify a number of components required to explain a majority of the variance within each group.

In one embodiment, performing the comparative analysis comprises: performing clustering of policies within each group based on the information set; and determining a similarity distance between clusters of policies. In one embodiment, the method further comprises: determining a spread of variation of each of the clusters of policies.

In one embodiment, the method further comprises: assigning a classifier to the overall complexity indicator for each group based on a distribution of the overall complexity indicator for that group as compared to other groups. In one embodiment, the classifier is selected from a group consisting of: critical, high, medium, and low.

In one embodiment, providing comprises: associating additional metadata with each group for the assessment interface. In one embodiment, the additional metadata is selected from a group consisting of: product family, device type, device manufacturer, management entity, policy type, policy class, and number of devices in group.

In one embodiment, policies are text based, and the method further comprises: converting each policy of the policies configured across the plurality of network devices in the computer network into a hash that provides a unique identification for each specific policy implementation within a particular group.

In one embodiment, the overall complexity indicator comprises a computed score value.

In one embodiment, the method further comprises: creating each group of policies based on a shared policy name by policies within that group.

In one embodiment, the method further comprises: collecting policies from each of the plurality of network devices in the computer network.

In one embodiment, the assessment interface is selected from a group consisting of: a graphical user interface, a policy audit process, and an autonomous policy remediation process.

In one embodiment, determining the information set comprises: performing a one hot encoding technique.

According to the embodiments herein, an illustrative tangible, non-transitory, computer-readable medium herein may have computer-executable instructions stored thereon that, when executed by a processor on a computer, may cause the computer to perform a method comprising: determining, for each group of policies configured across a plurality of network devices in a computer network, an information set having a list of all policy components used for each group and which policies within each group have which particular policy components of the list of all policy components used for that group; performing a comparative analysis of similarity and component variance on policies within each group based on the information set; deriving an overall complexity indicator for each group based on the comparative analysis; and providing, to an assessment interface, a ranking of each group as compared to other groups of policies within the computer network based on their respective overall complexity indicator.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: determine, for each group of policies configured across a plurality of network devices in a computer network, an information set having a list of all policy components used for each group and which policies within each group have which particular policy components of the list of all policy components used for that group; perform a comparative analysis of similarity and component variance on policies within each group based on the information set; derive an overall complexity indicator for each group based on the comparative analysis; and provide, to an assessment interface, a ranking of each group as compared to other groups of policies within the computer network based on their respective overall complexity indicator.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
  collecting, by the process, policies from a plurality of network devices in a computer network;
  determining, by the process, for each group of policies configured across a the plurality of network devices in the computer network, an information set having a list of all policy components used for each group and which policies within each group have which particular policy components of the list of all policy components used for that group;
  performing, by the process, a comparative analysis of similarity and component variance on policies within each group based on the information set;
  deriving, by the process, an overall complexity indicator for each group based on the comparative analysis; and providing, from the process to an assessment interface, a ranking of each group as compared to other groups of policies within the computer network based on their respective overall complexity indicator.

2. The method as in claim 1, wherein performing the comparative analysis comprises:
assessing variance at a policy component level to determine similarity as it relates to complexity.

3. The method as in claim 2, further comprising:
using a principal component analysis to identify a number of components required to explain a majority of the variance within each group.

4. The method as in claim 1, wherein performing the comparative analysis comprises:
performing clustering of policies within each group based on the information set; and
determining a similarity distance between clusters of policies.

5. The method as in claim 4, further comprising:
determining a spread of variation of each of the clusters of policies.

6. The method as in claim 1, further comprising:
assigning a classifier to the overall complexity indicator for each group based on a distribution of the overall complexity indicator for that group as compared to other groups.

7. The method as in claim 6, wherein the classifier is selected from a group consisting of:
critical, high, medium, and low.

8. The method as in claim 1, wherein providing comprises:
associating additional metadata with each group for the assessment interface.

9. The method as in claim 8, wherein the additional metadata is selected from a group consisting of: product family, device type, device manufacturer, management entity, policy type, policy class, and number of devices in group.

10. The method as in claim 1, wherein policies are text based, the method further comprising:
converting each policy of the policies configured across the plurality of network devices in the computer network into a hash that provides a unique identification for each specific policy implementation within a particular group.

11. The method as in claim 1, wherein the overall complexity indicator comprises a computed score value.

12. The method as in claim 1, further comprising:
creating each group of policies based on a shared policy name by policies within that group.

13. The method as in claim 1, wherein the assessment interface is selected from a group consisting of: a graphical user interface, a policy audit process, and an autonomous policy remediation process.

14. The method as in claim 1, wherein determining the information set comprises:
performing a one hot encoding technique.

15. A tangible, non-transitory, computer-readable medium having computer-executable instructions stored thereon that, when executed by a processor on a computer, cause the computer to perform a method comprising:
collecting policies from a plurality of network devices in a computer network;
determining, for each group of policies configured across the plurality of network devices in the computer network, an information set having a list of all policy components used for each group and which policies within each group have which particular policy components of the list of all policy components used for that group;
performing a comparative analysis of similarity and component variance on policies within each group based on the information set;
deriving an overall complexity indicator for each group based on the comparative analysis; and
providing, to an assessment interface, a ranking of each group as compared to other groups of policies within the computer network based on their respective overall complexity indicator.

16. The tangible, non-transitory, computer-readable medium as in claim 15, wherein performing the comparative analysis comprises:
assessing variance at a policy component level to determine similarity as it relates to complexity.

17. The tangible, non-transitory, computer-readable medium as in claim 16, wherein the method further comprises:
using a principal component analysis to identify a number of components required to explain a majority of the variance within each group.

18. The tangible, non-transitory, computer-readable medium as in claim 15, wherein performing the comparative analysis comprises:
performing clustering of policies within each group based on the information set; and
determining a similarity distance between clusters of policies.

19. An apparatus, comprising:
one or more network interfaces to communicate with a network;
a processor coupled to the one or more network interfaces and configured to execute one or more processes; and
a memory configured to store a process that is executable by the processor, the process, when executed, configured to:
collect policies from a plurality of network devices in a computer network;
determine, for each group of policies configured across the plurality of network devices in the computer network, an information set having a list of all policy components used for each group and which policies within each group have which particular policy components of the list of all policy components used for that group;
perform a comparative analysis of similarity and component variance on policies within each group based on the information set;
derive an overall complexity indicator for each group based on the comparative analysis; and
provide, to an assessment interface, a ranking of each group as compared to other groups of policies within the computer network based on their respective overall complexity indicator.

* * * * *